United States Patent [19]
Kimura et al.

[11] Patent Number: 5,465,474
[45] Date of Patent: Nov. 14, 1995

[54] CYLINDRICALLY MACHINING APPARATUS

[75] Inventors: Tomohisa Kimura; Akira Ikoma, both of Komatsu, Japan

[73] Assignee: Kabushiki Kaisha Komatsu Seisakusho, Tokyo, Japan

[21] Appl. No.: 199,146

[22] PCT Filed: Jun. 28, 1993

[86] PCT No.: PCT/JP93/00883

§ 371 Date: Feb. 25, 1994

§ 102(e) Date: Feb. 25, 1994

[87] PCT Pub. No.: WO94/00272

PCT Pub. Date: Jan. 6, 1994

[30] Foreign Application Priority Data

Jun. 29, 1992 [JP] Japan ................................. 4-170960

[51] Int. Cl.[6] .......................... B23Q 15/26; B23C 3/06; B24B 49/00

[52] U.S. Cl. ..................... 29/601; 364/474.06; 409/200; 451/5

[58] Field of Search ............................ 409/80, 200, 199, 409/131, 132; 29/6.01; 51/165 R, 165.71, 165.91; 364/474.06

[56] References Cited

U.S. PATENT DOCUMENTS

| | | | |
|---|---|---|---|
| 4,294,045 | 10/1981 | Enomoto et al. | 51/165.71 |
| 4,375,670 | 3/1983 | Kralowetz et al. | 364/474.06 |
| 4,384,333 | 5/1983 | Maecker | 364/474.06 |
| 5,238,337 | 8/1993 | Nussbaumer et al. | 409/200 X |

FOREIGN PATENT DOCUMENTS 62-255047  11/1987  Japan.

*Primary Examiner*—William Briggs
*Attorney, Agent, or Firm*—Varndell Legal Group

[57] ABSTRACT

A machining apparatus for improving the roundness of a work. The outer circumference of a work is divided into predetermined intervals, and a difference between the radius of that portion of the work after machined and a target radius thereof is detected for each of the intervals. The position of a tool which corresponds to every predetermined rotation angle is corrected on the basis of a detected radius difference at each of the intervals. The path of the tool is interpolation-computed on the basis of the corrected positions. The tool is turned along the interpolated path, so that the work is machined with a high precision.

5 Claims, 10 Drawing Sheets

CYLINDRICALLY MACHINING APPARATUS

TECHNICAL FIELD

The present invention relates to an apparatus, such as a crankshaft miller, for machining a work into a product having a cylindrical circumference, and more particularly to a cylindrically machining apparatus capable of improving roundness in the circumference of a machined product.

BACKGROUND ART

A crankshaft miller of a type in which a milling cutter with the inner teeth being contacted with the outer surface of a work rotates at a high speed, thereby machining the journal of a crankshaft to have a cylindrical circumference, is known. A motion of the milling cutter is shown in FIGS. 14(a) to 14(d) in which the center c of the milling cutter 1 moves in the direction of an arrow d along a path (circle) b located at a predetermined distance r from the center a of a work WK. A plurality of tips 1a formed on the inner side of the milling cutter 1 rotates about the center c, thereby cutting the outer surface of the work.

The milling cutter 1 is moved under the control of a program prepared by an NC machine. In the NC program, the motion of the milling cutter is defined by a single command given by, for example,

G02 X90. Y75. I0. J35.

In the command, "G02" indicates "arc interpolation designation", "X90. Y75." indicates "X and Y coordinates at the start point S and the end point E (same as the start point S) of the center c of the milling cutter 1" and "I0. J35." indicates "X and Y coordinates of the rotational center a relative to the start point S".

In machining the outer surface of the work WK such as a crankshaft, rigidity of the work varies with the position of the rotation. Accordingly, roundness of the circumference of the machined work WK varies as indicated by a contour C' in FIG. 15, which is deformed from a circle C, causing an error. To make the contour C' of the work WK coincident with the circle C by displacing inward or outward the segments e, f, g, and h of the contour C', the path through which the center of the milling cutter 1 moves must be corrected into a path b' having segments e', f', g', and h' as shown in FIG. 16 according to the deformation of the segments e, f, g, and h.

As mentioned above, commands used in an NC machine are such a command that "move along a circle of a fixed radius". The correction that is carried out by the command is limited to a correction of the milling cutter motion over the entire circle. It is impossible to correct each segment of the contour indicated by the path b'. With such a command, it is impossible to improve roundness of the contour of a machined work.

The present invention has been made in view of the above background and its object is to provide a machining apparatus in which a path of its cutting tool is corrected according to the commands different for each segment of the circumference of a work, thereby remarkably improving roundness of the resultant product.

DISCLOSURE OF INVENTION

To achieve the above object, there is provided a cylindrically machining apparatus for machining a work by turning a tool along a circumference of the work so that the circumference has a target radius, comprising detection means for dividing the circumference of the work into predetermined intervals and for detecting a difference between radius of the work after machined and a target radius thereof for each of the intervals; calculating means for correcting the position of the tool every predetermined rotation angle based on the radius difference detected by the detecting means, and for interpolation-computing a path of the tool based on the corrected position of each rotation angle; and control means for turning the tool along the path calculated by the calculating means.

With such a construction of the invention, the circumference of a work is divided into predetermined intervals and difference between the radius of a work after machined and the target radius for each of the intervals is detected. The position of the tool is corrected at every predetermined rotation angle according to the detected radius difference. A path of the tool is interpolation-computed according to the corrected position of each rotation angle and the tool is turned along the interpolation-computed path. Thus, a work is machined with a high precision.

BEST MODE FOR CARRYING OUT THE INVENTION

Figures 14A, 14B, 14C, 14D:
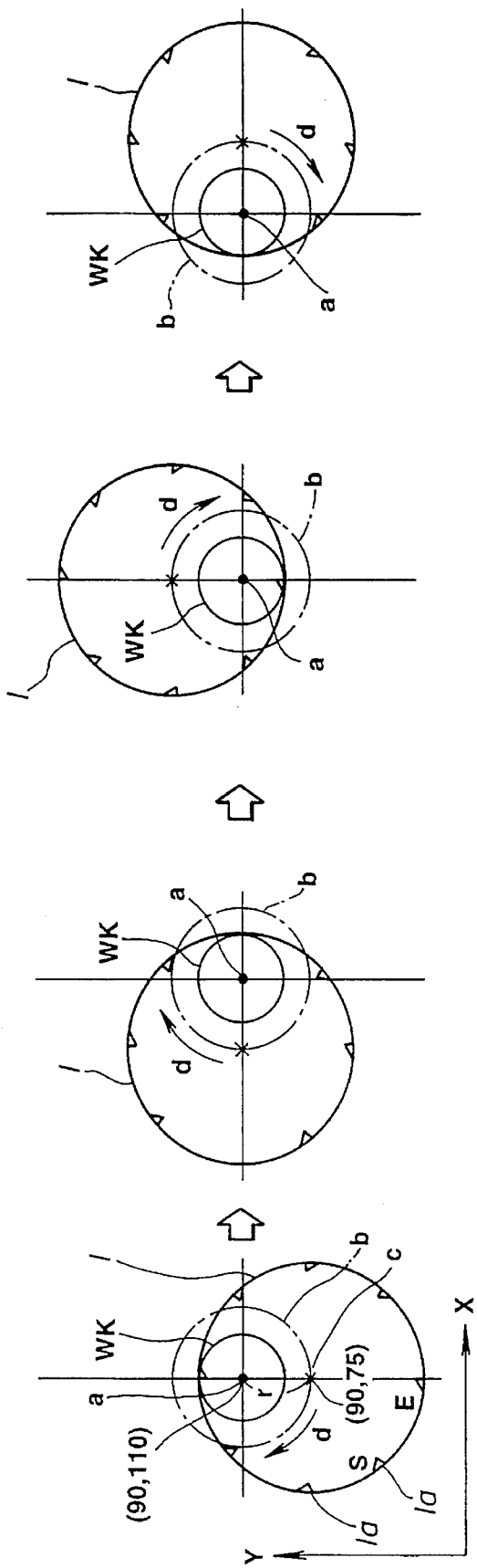
FIGS. 14(a) through 14(d) show a series of diagrams for explaining a motion of a milling cutter in a crankshaft miller.
Figure 15:
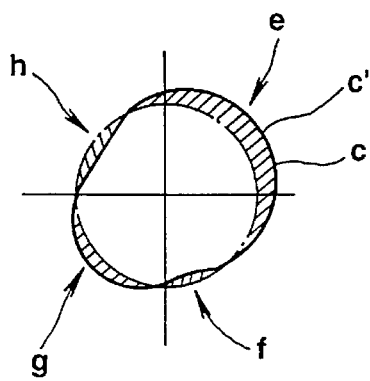
FIG. 15 is a diagram showing the result of measuring roundness of a work machined by a milling cutter.
Figure 16:
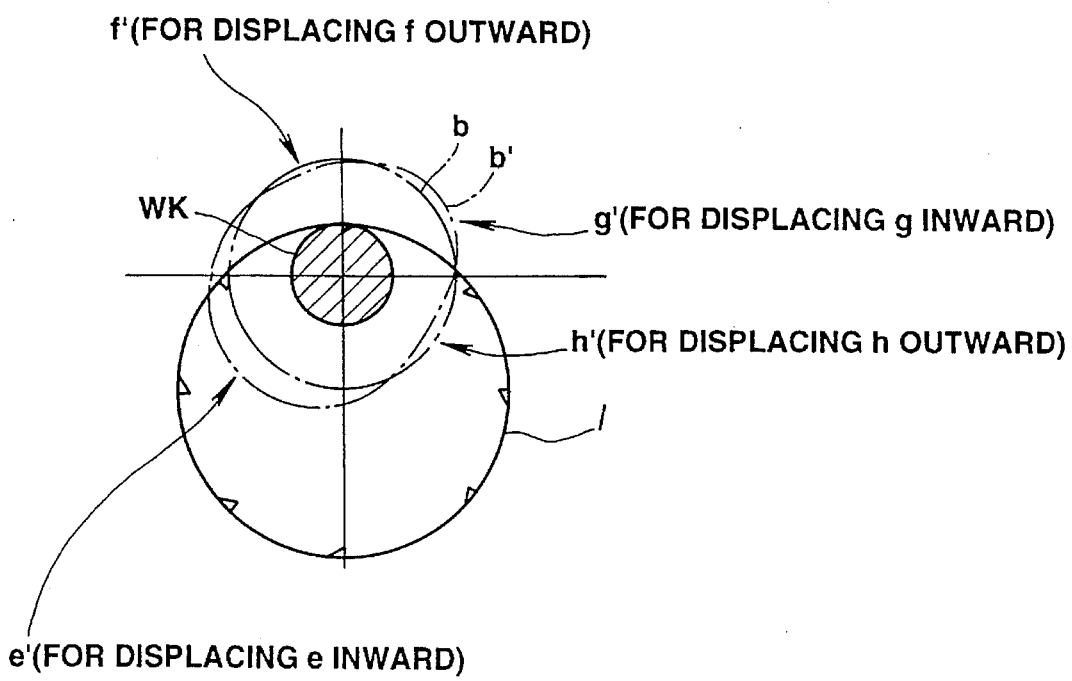
FIG. 16 is a diagram showing a path of the center of a milling cutter that is to be corrected according to the measuring result of FIG. 15.

An embodiment of a cylindrically machining apparatus according to the present invention will be described with reference to the accompanying drawings. In the embodiment, the present invention is applied for a crankshaft miller. The motion of a milling cutter in the crankshaft miller is similar to that already described referring to FIG. 14. Same reference characters used in FIG. 14 will be used also in the description of the embodiment.

Figure 1:
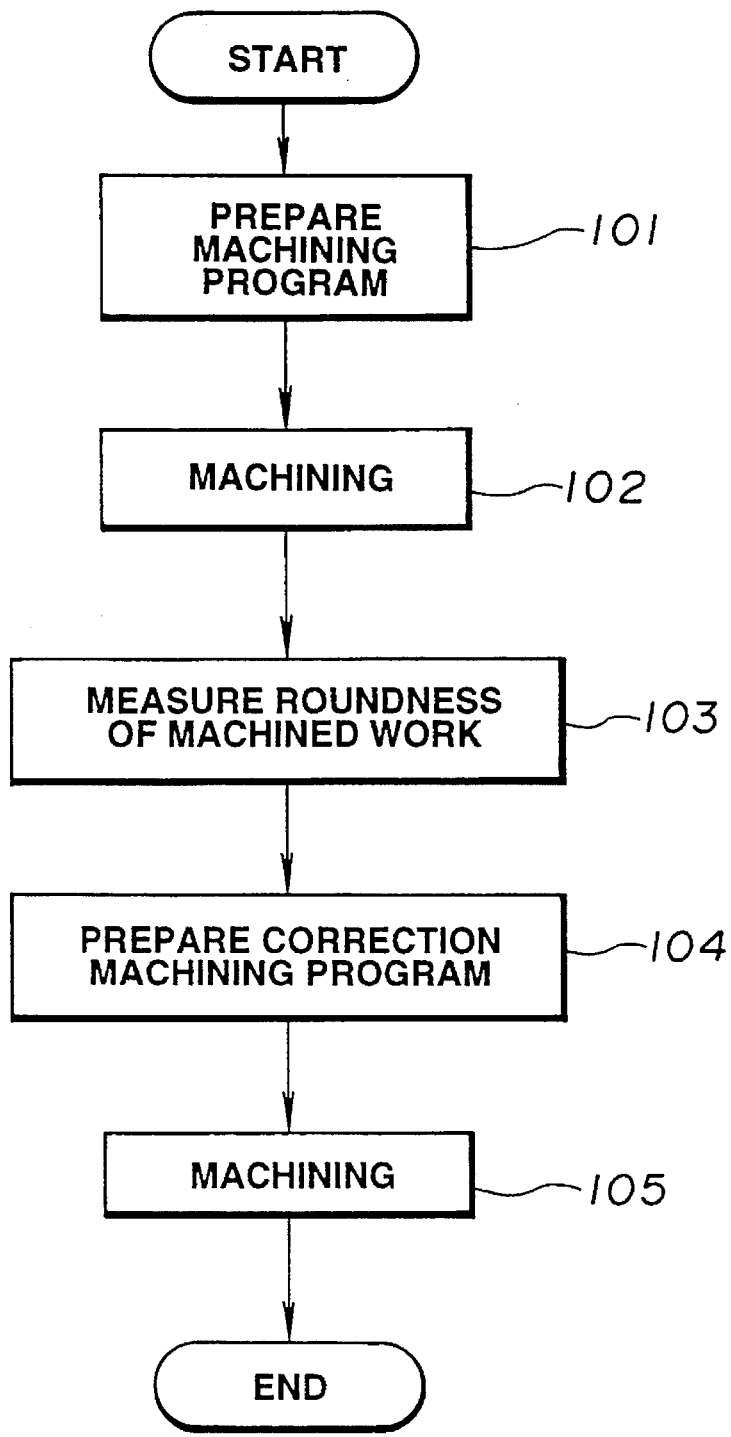
FIG. 1 is a flowchart showing a sequence of steps of a machining procedure in an embodiment of a cylindrically machining apparatus according to the present invention.
Figure 2:
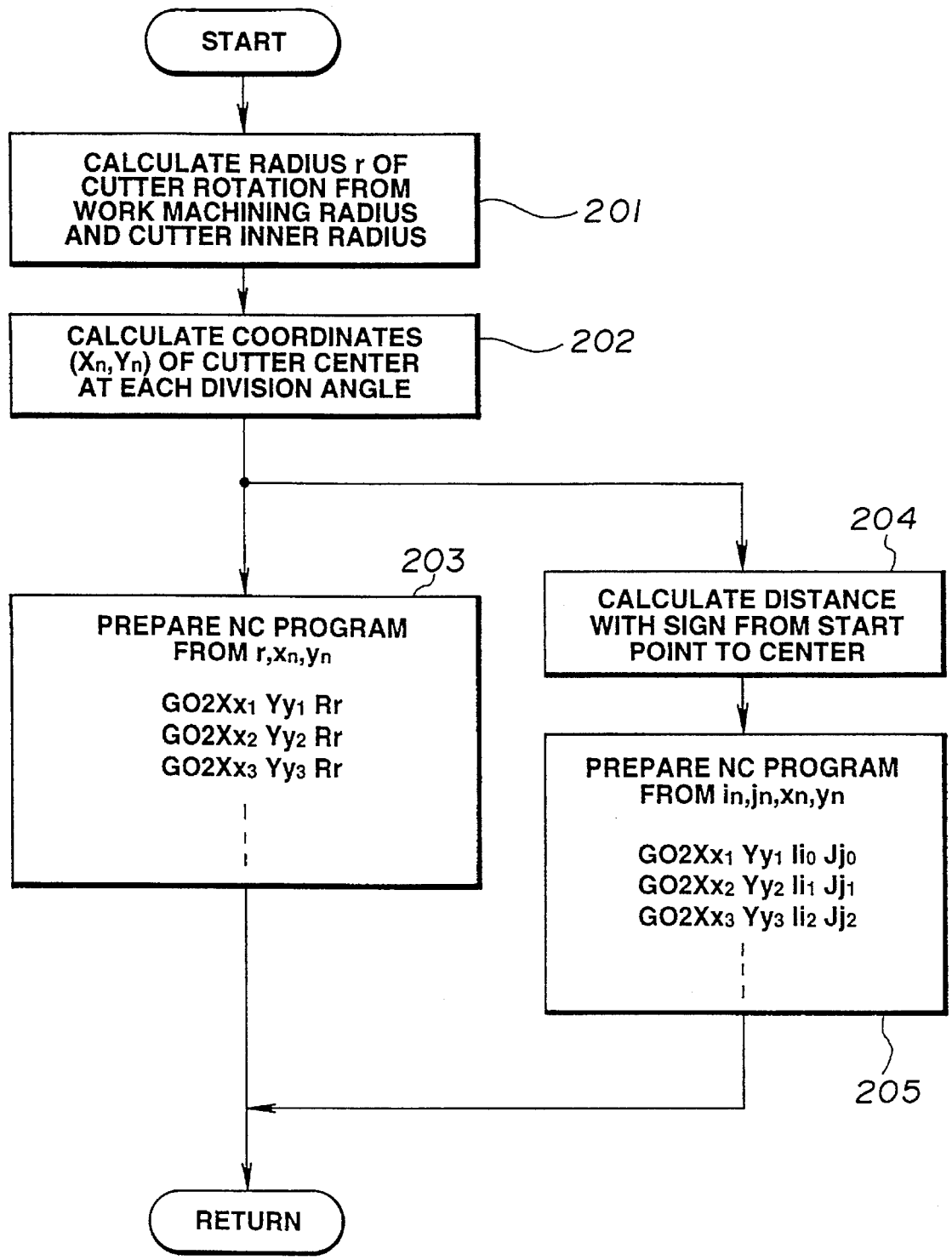
FIG. 2 is a flowchart showing a sequence of steps for preparing a machining program in FIG. 1.
Figure 4:
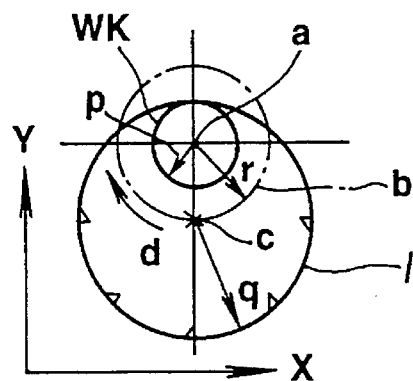
FIG. 4 is a diagram showing the relative positions of the portions of a crankshaft miller applied to the embodiment.
Figure 5:
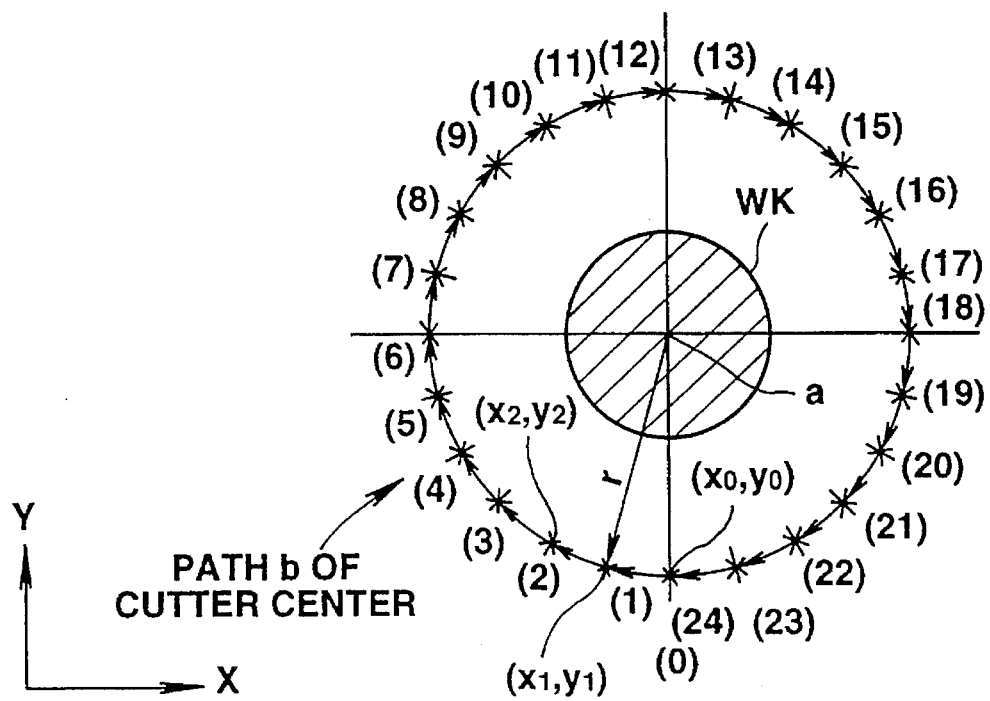
FIG. 5 is a diagram showing the segmented path of the center position of a milling cutter.

Referring to FIG. 1 showing a sequence of steps of a machining procedure, a machining program is prepared using known data in an NC machine (step 101). In this step, a routine shown in FIG. 2 is carried out. As shown in FIG. 4, a machining radius P of a work WK, i.e., the journal WK of a crankshaft, and the inner radius g of a milling cutter 1 as a cutting tool are known. Using these radiuses, a radius r of a path for the center C of the milling cutter 1 is calculated (step 201). As shown in FIG. 5, a path b of the cutter center is divided, every 15°, into 24 segments. Then, X-Y coordinates (x1, y1), (x2, y2),... (x0, y0) at the points (1), (2), ... (24) ((0)) on the divided path b are calculated (step 202).

Subsequently, an NC program to move the center c of the milling cutter 1 along a predetermined path is prepared. Since the center c of the cutter 1 moves along the circumference of the work, each segment forms an arc. The radius r and the center a of each arc are designated.

An NC program for designating the radius of the arc is prepared for every segment of the path of the cutter center as follows:

G02 Xx1 Yy1 Rr
G02 Xx2 Yy2 Rr
G02 Xx3 Yy3 Rr
. . . . . . . . . .

The program is shown in Table 1.

TABLE 1

| Point | NC program | Point | NC program |
|---|---|---|---|
| (1) | G02Xx1Yy1Rr | (13) | G02Xx13Yy13Rr |
| (2) | G02Xx2Yy2Rr | (14) | G02Xx14Yy14Rr |
| (3) | G02Xx3Yy3Rr | (15) | . |
| (4) | G02Xx4Yy4Rr | (16) | . |
| (5) | . | (17) | . |
| (6) | . | (18) | . |
| (7) | . | (19) | . |
| (8) | . | (20) | . |
| (9) | . | (21) | . |
| (10) | . | (22) | . |
| (11) | . | (23) | . |
| (12) | . | (24) | G02Xx0Yy0Rr |

In the program, "Xx1 Yy1 Rr" means "Move along the arc of the radius r of a segment from a start point (24) or (0) to a point (1)". "Xx2 Yy2 Rr" means "Move on the arc of the radius r of a segment from a point (1) to a point (2)". The remaining commands have similar meanings (step 203).

Figure 6:
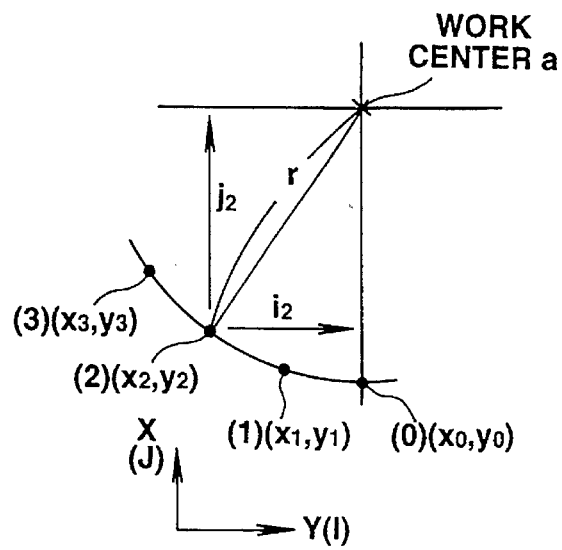
FIG. 6 is a diagram showing a relationship between the center of a work and the center positions of a milling cutter.

In preparing the program, the center position a of the arc may be used for the instruction of the motion of the milling cutter, instead of the radius of curvature r that is used in the program stated above. When using the center position a, the center position a of the arc is designated at every division point. The center position a of the arc is specified as a position (in, jn) relative to the center position a as the start point of the arc. For an arc ranging from a division point (2) to another division point (3) as shown in FIG. 6, the start point is the point (2) and its coordinates are (x2, y2). The center position a is specified by the distances i2 and j2 of the coordinates (x2, y2) relative to a point a. Polarities are assigned to the relative distances i2 and y2 according to the X-axis and Y-axis directions. Thus, an NC program for designating the center position a of the arc is prepared for every segment as follows:

G02 Xx1Yy1Ii0Jj0
G02 Xx2Yy2Ii1Jj1
G02 Xx3Yy3Ii2Jj2
. . . . . . . . .

In the program, "G02 Xx1Yy1Ii0Jj0" means "in the segment from a start point (24) or (0) to a division point (1), the center of the arc is positioned at a distance i0 from the start point (24) in the X-direction and at a distance j0 in the Y-axis". The remaining commands mean similar instructions (step 205).

After the NC program is prepared, the procedure returns to the step 101 in FIG. 1. Under the numerical control according to the prepared NC program, the milling cutter 1 machines the work while the center c of the milling cutter 1 depicts the path b as shown in FIG. 5 (step 102).

Figure 3:
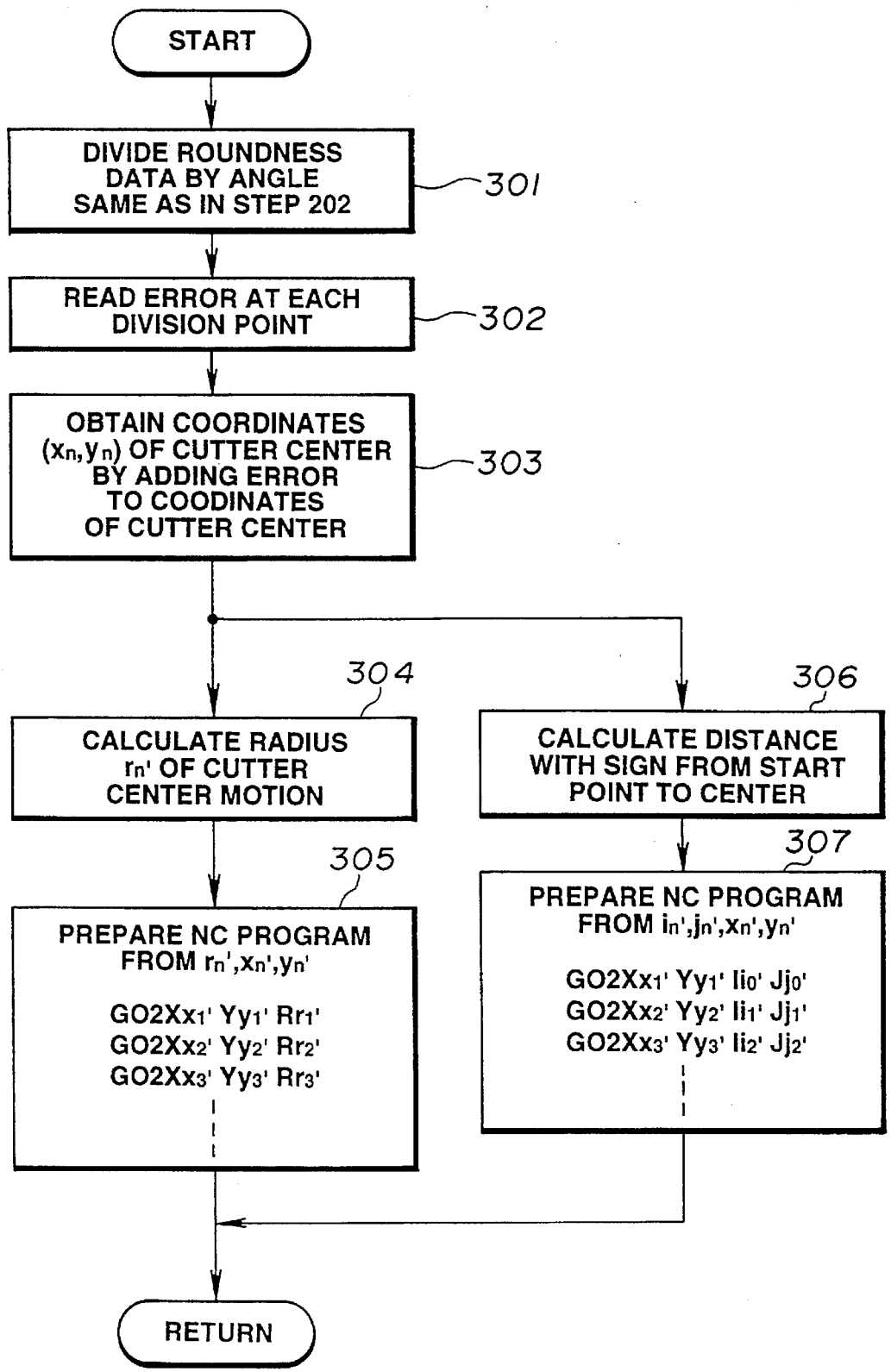
FIG. 3 is a flowchart showing a sequence of steps for preparing a correction machining program shown in FIG. 1.
Figure 8:
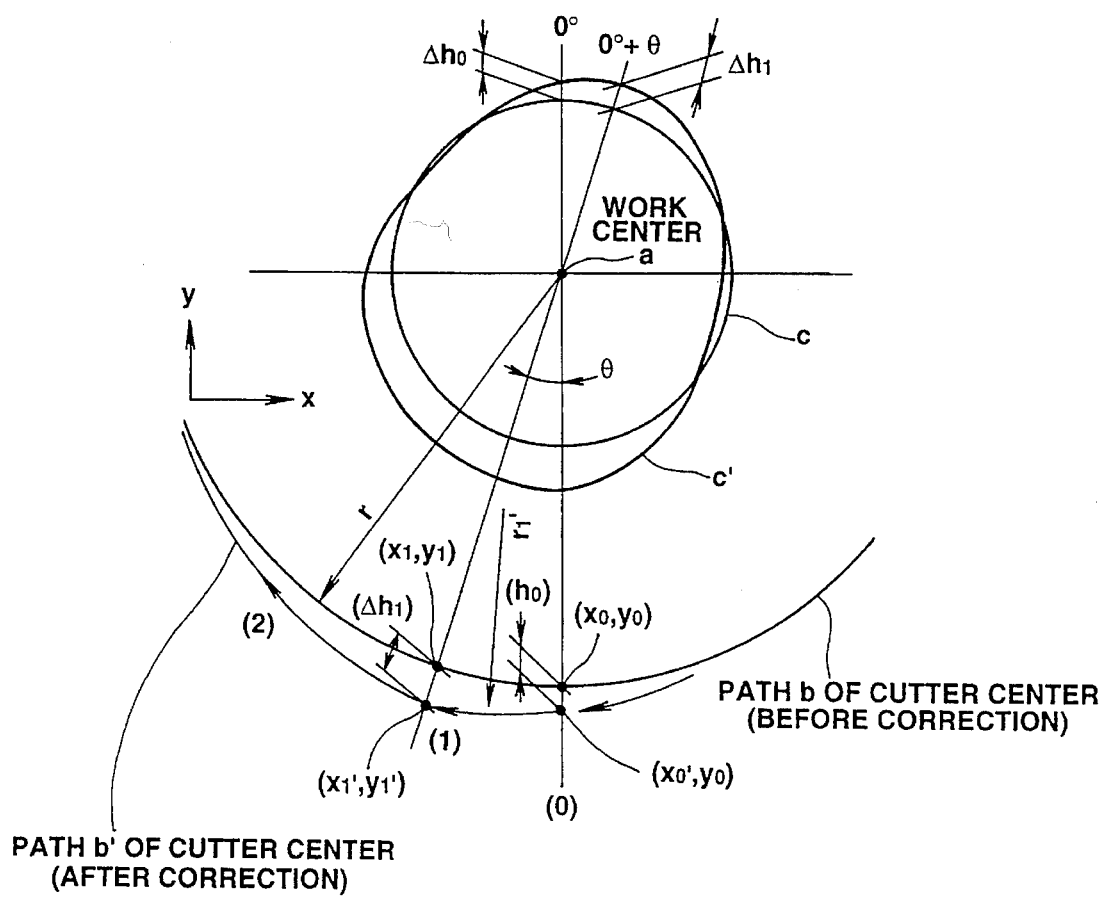
FIG. 8 is a diagram showing a relationship between a machining error of a work and a quantity of correction of the path of the center of a milling cutter.

Roundness of the machined work WK is measured (step 103). Then, a correction machining program is prepared on the basis of the measuring result (step 104). The procedure goes to a routine shown in FIG. 3. In the routine, the outer surface of a work WK is divided every predetermined angle 8 (15°) into segments as in the step 202 (step 301). Difference between the target radius of the work WK, namely, a distance from the center a of the work WK to the circumference thereof when the circumference of the work is a circle C and distances from the center a of the work WK after it is machined to the circumference C' in other words differences $\Delta h0, \Delta h1, \ldots$ are measured at every predetermined angle $\theta$ (15°), e.g., at the division points (0), (1), . . . , as shown in FIG. 8 (step 302).

The differences $\Delta h0, \Delta h1, \ldots$ are added to the coordinates (x0, y0), (x1, y1), . . . at the division points (0), (1), . . . As a result, the coordinates at the division points (0), (1), . . . are corrected as follows:

$$x'0 = x0$$
$$y'0 = y0 - \Delta h0$$
$$x'1 = x1 - \Delta h1 \cdot \sin\theta \text{ (where } x1 = -r\sin\theta\text{)}$$
$$y'1 = y1 - \Delta h1 \cdot \cos\theta \text{ (where } y1 = -r\cos\theta\text{)}$$
$$\ldots$$
$$x'n = xn - \Delta hn \cdot \sin\theta$$
$$y'n = yn - \Delta hn \cdot \cos\theta \quad \ldots \quad (1)$$

When the difference of the work WK at the position 0° is $\Delta h0$ where C' is larger than C, the center of the milling cutter 1 is shifted $\Delta h0$ outward in order to displace $\Delta h0$ the circumference of the work WK inward at the corresponding division point (0). When the difference of the work WK at the position 0°+$\theta$ is $\Delta h1$ where C' is larger than C, the center of the milling cutter 1 is shifted $\Delta h1$ outward in order to displace $\Delta h1$ the circumference of the work WK inward at the corresponding division point (1). At other division points (2), (3), etc., the center of the cutter 1 is shifted in like manner (step 303).

Subsequently, each segment between the adjacent division points are interpolated by an arc according to the corrected coordinates (xn, yn) (n=0, 1, . . .). A radius r'n (n=1, 2, . . .) of each arc is calculated (FIG. 7) or the center a' of each arc is calculated. The calculation is performed in various ways as given hereinafter (steps 304 and 306).

Figure 9:
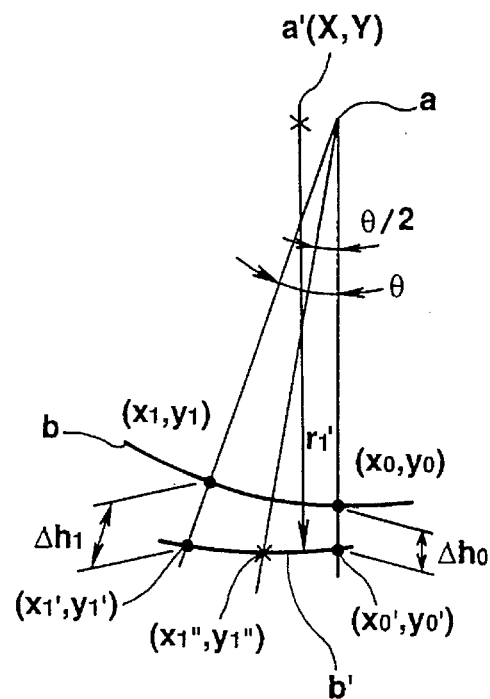
FIG. 9 is a diagram for explaining an example of correcting calculation in the embodiment.

First calculation (FIG. 9)

In a first calculation, a middle point between the adjacent division points is calculated, and a radius r'n is calculated using these three points, as shown in FIG. 9. In an example of the segment between the division points (0) and (1), the cutter center position (x"1, y"1) corresponding to the intermediate angle 0°+θ/2 between the positions 0° and 0°+θ (FIG. 8) on the circumference of the work WK is generated as given by the following equation (2).

$$x''1 = -r \cdot \sin\theta/2 - \{(\Delta h0 + \Delta h1)/2\}\sin\theta/2$$

$$y''1 = -r \cdot \cos\theta/2 - \{(\Delta h0 + \Delta h1)/2\}\cos\theta/2 \quad (2)$$

The equation holds on the assumption that a difference at the angle 0°+θ/2 is a mean value of the difference Δh0 at 0° C. and the difference Δh1 at θ. The radius r'1 of the arc passing these three points (x'0, y'0), (x"1, y"1), (x'1, y'1) is calculating by the following simultaneous equations. The result of the calculation is the radius r'1 of the motion of the cutter center.

$$(x'0-X)^2+(y'0-Y)^2=(r'1)^2$$

$$(x''1-X)^2+(y''1-Y)^2=(r'1)^2$$

$$(x'1-X)^2+(y'1-Y)^2=(r'1)^2 \quad (3)$$

where
X: coordinate of the center of the arc in the X-direction
Y: coordinate of the center of the arc in the Y-direction
A relative distance (i'0, j'0) is calculated as shown in FIG. 6 to obtain $$i'0 = X - x'0$$

$$j'0 = Y - y'0 \quad (4)$$

Thus, the center a' of the rotation of the milling cutter 1 (the center in the interpolated arc) is specified. Subsequently, the radius r'n for n=2, 3, . . . and the relative distance (i'n, j'n) for n=1, 2, . . . are calculated as in the manner of the equations (3) and (4).

Figure 10:
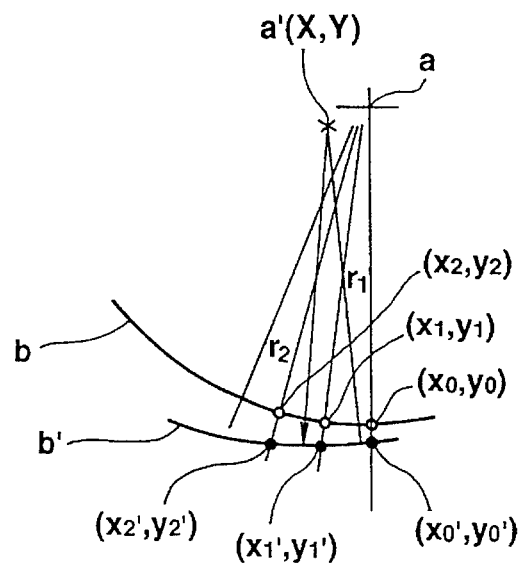
FIG. 10 is a diagram for explaining another example of correcting calculation in the embodiment.

Second Calculation (FIG. 10)

In the second calculation, the radius r'n and the relative distance (i'n, j'n) are calculated on the basis of the corrected coordinates at three successive division points.

In an example of three division points (0), (1), and (2) shown in FIG. 10, the radius r'1 (r=r'2) of an arc passing through the corresponding three points (x'0, y'0), (x'1, y'1), and (x'2, y'2) are calculated using the following simultaneous equations. The resultant solution is used as the radius r'1 of motion of the cutter center.

$$(x'0-X)^2+(y'0-Y)^2=(r'1)^2$$

$$(x'1-X)^2+(y'1-Y)^2=(r'1)^2$$

$$(x'2-X)^2+(y'2-Y)^2=(r'1)^2 \quad (5)$$

where
X: coordinate of the center of the arc in the X-direction
Y: coordinate of the center of the arc in the Y-direction
The relative distances (i'0, j'0) and (i'1, j'1) are calculated as follows.

$$i'0 = X - x'0$$

$$j'0 = Y - y'0$$

$$i'0 = X - x'1$$

$$j'0 = Y - y'1. \quad (6)$$

Thus, the center a' of the rotation of the cutter 1 is specified. Subsequently, the radius r'n for n=2, 3, . . . and the relative distance (i'n, j'n) for n=1, 2, . . . are calculated as in the manner of the equations (5) and (6).

Figure 12:
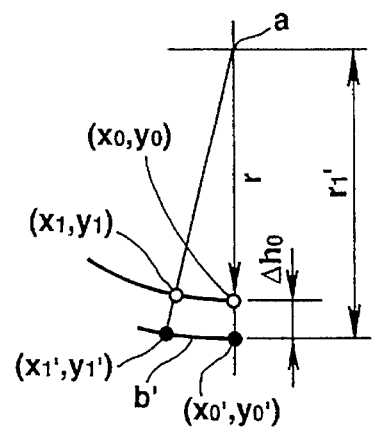
FIG. 12 is a diagram for explaining yet another example of correcting calculation in the embodiment.
Figure 13:
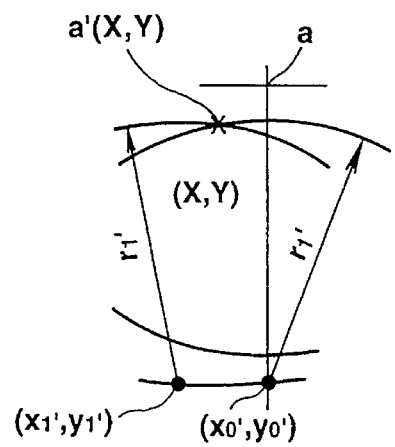
FIG. 13 is a diagram for explaining a further example of correcting calculation in the embodiment.

Third calculation (FIGS. 12 and 13)

In this calculation, the radius r'n is obtained by adding a radius difference to the coordinates at each division point. In an example of the division point (0) shown in FIG. 12, the radius r'1 of the arc between the division points (0) and (1) is calculated by $$r'1 = r + \Delta h0 \quad (7)$$

The coordinates (X, Y) of the center a' of the arc is obtained by solving the following simultaneous equations $$(x'0-X)^2+(y'0-Y)^2=(r1)^2$$

$$(x'1-X)^2+(y'1-Y)^2=(r1)^2 \quad (8)$$

The relative distance (i'0, j'0) is calculated as follows:

$$j'0 = X - x'0$$

$$j'0 = Y - y'0 \quad (9)$$

Thus, the center a' of the rotation of the cutter 1 is specified. Subsequently, the radius r'n for n=2, 3, . . . and the relative distance (i'n, j'n) for n=1, 2, . . . are calculated as in the manner of the equations (7) and (9).

Fourth calculation

In the calculation, correction is made for the division points but the radius E initially set is used as it is for the radius r. In an example of the arc between the division points (0) and (1), the coordinates (X, Y) of the center a' of the arc is obtained by solving the following simultaneous equations $$(x'0-X)^2+(y'0-Y)^2=r^2$$

$$(x'1-X)^2+(y'1-Y)^2=r^2 \quad (10)$$

Accordingly, the relative distance (i'0, j'0) is $$j'0 = X - x'0$$

$$j'0 = Y - y'0 \quad (11)$$

Thus, the center a' of the rotation of the cutter 1 is specified. Subsequently, the radius r'n for n=2, 3, . . . and the relative distance (i'n, j'n) for n=1, 2, . . . are calculated as in like manner.

Figure 11:
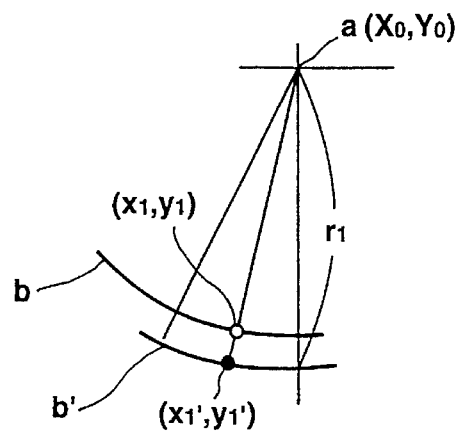
FIG. 11 is a diagram for explaining still another example of correcting calculation in the embodiment.

Fifth calculation (FIG. 11)

In this calculation, a distance between the coordinates of the division point after corrected and the center position a of the work center is used for the radius r'n. In an example of the arc between the division points (0) and (1), the radius r'1 is calculated using the following equation:

$$r'1 = \{(x'1-X0)^2+(y'-Y0)^2\}^{1/2} \quad (12)$$

where (X0, Y0) is the coordinates of the work center. This is substantially the same as that in the third calculation. Accordingly, as in FIG. 13, the coordinates (X, Y) of the center a' of the arc is obtained by solving the following simultaneous equations:

$$(x'0-X)^2+(y0-Y)^2=(r'1)^2$$

$$(x'1-X)^2+(y1-Y)^2=(r'1)^2 \quad (13)$$

The relative distance (i'0, j'0) is calculated as follows:

$$j'0 = X - x'0$$

$$j'0 = Y - y'0 \quad (14)$$

Thus, the center a' of the rotation of the cutter 1 is specified. Subsequently, the radius r'n for n=2, 3, ... and the relative distance (i'n, j'n) for n=1, 2, ... are calculated as in like manner.

Using the radius r'n thus calculated, the NC program for each segment is prepared for every segment as follows:

```
G02 Xx'1Yy'1Rr'1
G02 Xx'2Yy'2Rr'2
G02 Xx'3Yy'3Rr'3
...
```

The NC programs prepared are shown in Table 2.

TABLE 2

| Point | NC program | Point | NC program |
|-------|------------|-------|------------|
| (1)   | G02Xx'1Yy'1Rr'1 | (13) | G02Xx'13Yy'13Rr'13 |
| (2)   | G02Xx'2Yy'2Rr'2 | (14) | G02Xx'14Yy'14Rr'14 |
| (3)   | G02Xx'3Yy'3Rr'3 | (15) | . |
| (4)   | . | (16) | . |
| (5)   | . | (17) | . |
| (6)   | . | (18) | . |
| (7)   | . | (19) | . |
| (8)   | . | (20) | . |
| (9)   | . | (21) | . |
| (10)  | . | (22) | . |
| (11)  | . | (23) | . |
| (12)  | . | (24) | G02Xx'24Yy'24Rr'24 |

In the above program, "Xx'1 Yy'1 Rr'1" means "Move along the arc of the radius r'1 of curvature in the segment from a start point (24) or (0) to a point (1)". "Xx'2 Yy'2 Rr'2" means "Move along the arc of the radius r'2 of curvature in the segment from a point (1) to a point (2)". The remaining commands have similar meanings (step 305). Thus, an NC program for designating the center position of the arc, i.e., the relative distance (i'n, j'n), is prepared for every segment as follows:

```
G02 Xx'1Yy'1Ii'0Jj'0
G02 Xx'2Yy'2Ii'1Jj'1
G02 Xx'3Yy'3Ii'2Jj'2
...
```

In the program, "G02 Xx'1Yy'1Ii'0Jj'0" states "in the segment from a start point (24) or (0) to a division point (1), the center of the arc is positioned at a distance i'0 from the start point (24) in the X-direction and at a distance j'0 in the Y-axis". The remaining commands state similar instructions (step 307).

Figure 7:
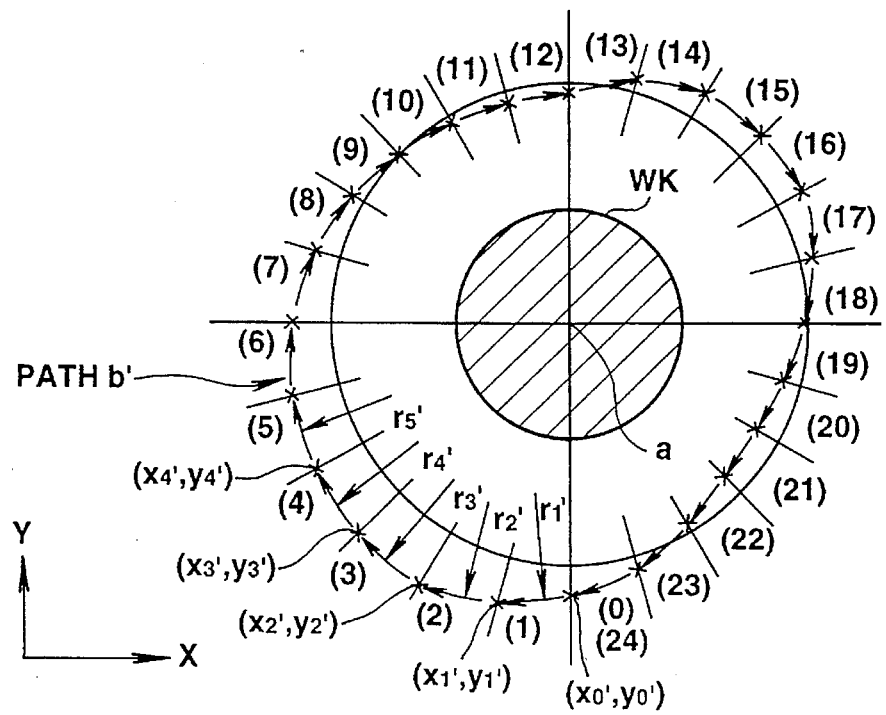
FIG. 7 is a diagram showing the path of the center position of a milling cutter after it is corrected.

After the NC program is prepared, the procedure returns to the step 105 in FIG. 1. Under the numerical control according to the prepared NC program, the milling cutter 1 machines the work while the center c of the milling cutter 1 depicts the path b' as shown in FIG. 7 (step 105).

In the above-described embodiment the cutter with the inner teeth is used for machining the work since the present invention is applied for a crankshaft miller. The tool may be replaced with any type of tool, such as a tool with the outer teeth, if it can shape the outer surface of the work as desired.

In the above-described embodiment the path of the cutter center is divided into 24 segments every 15°. However, the number of the segments is not limited to 24 and it may be divided into 36 segments every 10°, for example.

Further, the tool path may be divided unequally in accordance with the work machining characteristic. For example, it may be divided at the positions of 0°, 30°, 60°, 80°, 85°, 90°, 120°, etc.

INDUSTRIAL APPLICABILITY

As seen from the foregoing description, the path of the tool is divided into a plural number of segments. The path of the tool is corrected for every segment. Therefore, roundness of the work to be machined is improved. The resultant accuracy improvement remarkably enhances the reliability of the machine tool.

The improvement of the roundness of a product reduces the number of steps of the subsequent process. This leads to a considerable reduction of cost.

We claim:

1. A cylindrically machining apparatus for machining a work by turning a tool along a circumference of the work so that the circumference has a target radius, comprising:

detecting means for dividing the circumference of the work into predetermined intervals and for detecting a difference between radius of the work after machined and a target radius thereof for each of the intervals;

calculating means for correcting the position of the tool at every predetermined rotation angle based on the radius difference detected by the detecting means, and for interpolation-computing a path of the tool based on the corrected position of each rotation angle; the calculating means interpolation computing the path of the tool by calculating a middle position between adjacent a two corrected positions of the tool, and by determining radius of an arc passing through these two corrected positions and the middle position as radius of the path of the tool; and control means for turning the tool along the path calculated by the calculating means.

2. A cylindrically machining apparatus for machining a work by turning a tool along a circumference of the work so that the circumference has a target radius, comprising:

detecting means for dividing the circumference of the work into predetermined intervals and for detecting a difference between radius of the work after machined and a target radius thereof for each of the intervals;

calculating means for correcting the position of the tool at every predetermined rotation angle based on the radius difference detected by the detecting means, and for interpolation-computing a path of the tool based on the corrected position of each rotation angle; the calculating means interpolation-computing the path of the tool in such a manner that radius of an arc passing through adjacent three corrected positions is determined as radius of the path of the tool; and control means for turning the tool along the path calculated by the calculating means.

3. A cylindrically machining apparatus for machining a work by turning a tool along a circumference of the work so that the circumference has a target radius, comprising:

detecting means for dividing the circumference of the work into predetermined intervals and for detecting a difference between radius of the work after machined and a target radius thereof for each of the intervals;

calculating means for correcting the position of the tool at every predetermined rotation angle based on the radius difference detected by the detecting means, and for interpolation-computing a path of the tool based on the corrected position of each rotation angle; the calculating means interpolation-computing the path of the tool in such a manner that radius of an arc passing through adjacent two corrected positions is equal to the sum of radius of the path of the tool and the difference associated with the adjacent corrected positions; and control means for turning the tool along the path calculated by the calculating means.

4. A cylindrically machining apparatus for machining a work by turning a tool along a circumference of the work so that the circumference has a target radius, comprising:

detecting means for dividing the circumference of the work into predetermined intervals and for detecting a difference between radius of the work after machined and a target radius thereof for each of the intervals;

calculating means for correcting the position of the tool at every predetermined rotation angle based on the radius difference detected by the detecting means, and for interpolation-computing a path of the tool based on the corrected position of each rotation angle; the calculating means interpolation-computing the path of the tool in such a manner that center position of an arc passing through adjacent two corrected positions is calculated while considering radius of the path of the tool before correction as radius of an arc passing through any adjacent two corrected positions, and the path of the tool is determined to be an arc which has the calculated center position as a center thereof and the radius of the path of the tool before correction as a radius thereof and which passes through adjacent two corrected positions; and control means for turning the tool along the path calculated by the calculating means.

5. A cylindrically machining apparatus for machining a work by turning a tool along a circumference of the work so that the circumference has a target radius, comprising:

detecting means for dividing the circumference of the work into predetermined intervals and for detecting a difference between radius of the work after machined and a target radius thereof for each of the intervals;

calculating means for correcting the position of the tool at every predetermined rotation angle based on the radius difference detected by the detecting means, and for interpolation-computing a path of the tool based on the corrected position of each rotation angle; the calculating means interpolation-computing the path of the tool by determining that distance between the center position of the tool and the corrected position as radius of an arc passing through adjacent two corrected positions of the tool; and control means for turning the tool along the path calculated by the calculating means.

* * * * *